Patent Number: 4,660,978
Date of Patent: Apr. 28, 1987

[54] DIRECT SLOPE MEASUREMENT SHEARING INTERFEROMETER

[75] Inventor: Ning Wu, Rancho Palos Verdes, Calif.

[73] Assignee: Hughes Aircraft Company, Los Angeles, Calif.

[21] Appl. No.: 683,783

[22] Filed: Dec. 19, 1984

[51] Int. Cl.⁴ ............................................... G01B 9/02
[52] U.S. Cl. ..................................... 356/353; 356/359
[58] Field of Search ................ 356/353, 346, 358, 359

[56] References Cited

U.S. PATENT DOCUMENTS

| | | |
|---|---|---|
| 3,921,080 | 11/1975 | Hardy . |
| 3,923,400 | 12/1975 | Hardy . |
| 4,025,195 | 5/1977 | Ebersole et al. . |
| 4,053,231 | 10/1977 | Fletcher et al. ............... 356/346 X |
| 4,141,652 | 2/1979 | Feinleib . |
| 4,438,330 | 3/1984 | Hardy . |
| 4,441,019 | 4/1984 | Hardy . |

OTHER PUBLICATIONS

"Precision Optical Wavefront Measurements" by Mosche Schaham, Zygo Corp., (1981).

Primary Examiner—Davis L. Willis
Assistant Examiner—Matthew W. Koren
Attorney, Agent, or Firm—Ronald L. Taylor; A. W. Karambelas

[57] ABSTRACT

An improved method and apparatus for measuring the aberrated wave slope of an optical beam. The apparatus includes a shearing interferometer having a reference mirror 14 and a steerable mirror 16 mounted perpendicularly to one another with a beam splitter 10 disposed at a 45° angle to each. The beam splitter 10 directs a portion of the incident beam to the reference mirror to form a reference beam 20 and transmits a portion 22 of the incident beam to the steerable mirror. The steerable mirror 16 is pivoted about two mutually perpendicular axes to form a shearing interference pattern at a detector array 24 when a portion of the incident beam is reflected off the steerable mirror 16 and combines with the reference beam 20 reflected off the reference mirror. The reference mirror 14 is periodically displaced to modulate the reference beam 20. In operation, the steerable mirror 16 is first oriented pivotally about a first axis perpendicular to the propagation axis of the incident beam to a pre-selected angle and the reference mirror is then periodically displaced. The variations in detector intensities are sampled and stored N times during this reference mirror displacement. The steerable mirror is then oriented at the same pre-selected angle about a second axes perpendicular to the first pivotal axis and the beam propagation axis and the reference mirror 14 again periodically displaced. The resulting detector intensity values can be manipulated to yield the phase of the initially distorted beam which can be converted into aberrated wave slope data.

7 Claims, 1 Drawing Figure

U.S. Patent  Apr. 28, 1987  4,660,978
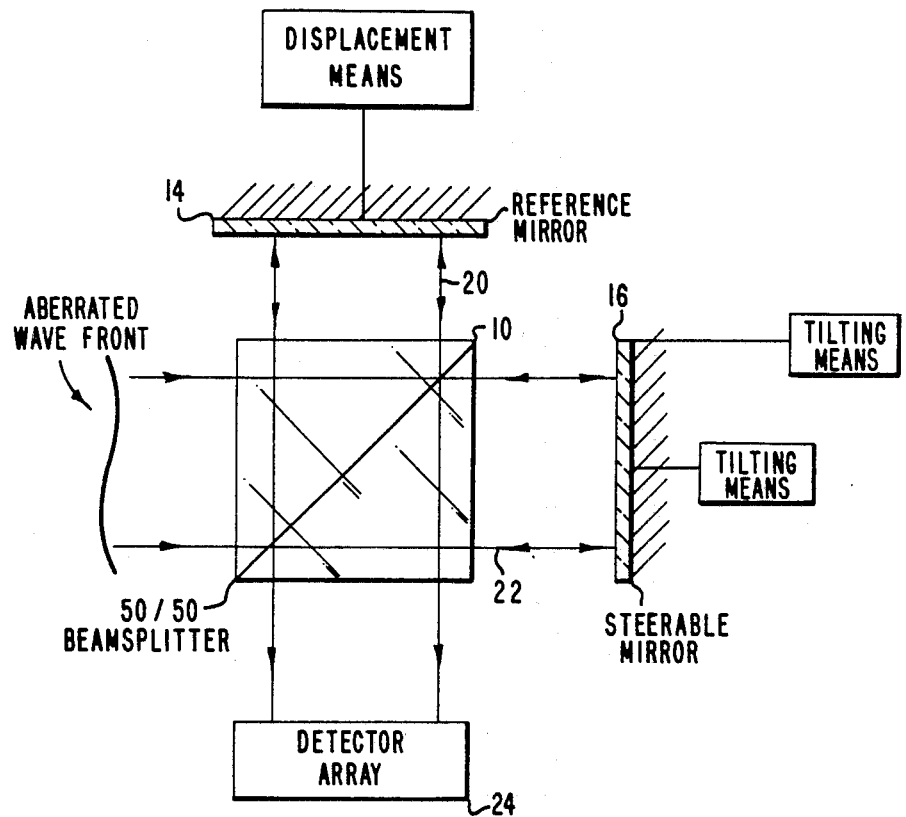

DIRECT SLOPE MEASUREMENT SHEARING INTERFEROMETER

1. Field of the Invention

The present invention concerns the field of optical waveform analysis and more particularly a method and apparatus for determining the aberration wave slope of a distorted optical beam.

2. Background of the Invention

In testing various types of optical systems, it is frequently desirable to analyze in real time the distortion of an optical beam either generated by or interacting with the optical system under investigation. The extent of optical beam distortion can be determined in terms of a number of related optical beam characteristics such as, for example, the optical path difference (OPD) between an aberrated wave front of the distorted beam and the same wave front in a non-aberrated state, or the phase difference ($\phi$) between the wave front in an aberrated and non-aberrated state. Since every point on the wave front can be located with respect to two orthogonal axes, the beam distortion is also sometimes represented as an aberrated wave slope ($\Delta$OPD). The aberrated wave slope represents the rate of change in the optical path difference between the wave front in an aberrated and non-aberrated state with respect to a change in either of the two orthogonal axes with respect to which points on the waveform are located.

A number of optical devices have been developed to measure these various optical beam distortion characteristics. One such device, described by Feinleib in U.S. Pat. No. 4,141,652, measures the aberrated wave slope ($\Delta$OPD) of a distorted optical beam passing through a specially configured aperture to strike portions of a detector array. Devices of this general type are commonly referred to as a Hartmann-type wave front sensors. Typical of Hartmann-type wave-front sensors, however, the Feinleib device is slow, requiring under some circumstances up to several minutes to measure the aberrated wave slope over an entire wave front. Thus, Hartmann-type wave front sensors are usually not appropriate for real time waveform analysis.

Another aberrated waveform analyzer is described by Hardy in U.S. Pat. Nos. 3,921,080 and 3,923,400. The Hardy device measures the phase difference of a distorted optical beam collected in an optical device, such as a telescope, in real time and further includes a mechanism for correcting the measured distortion within the optical device. Measurement of the phase difference is accomplished by two sets of perpendicularly oriented gratings vibrating to create a shearing interferogram at a detector array. A shearing interferogram is generally an interferring superposition of two beams in which the recombined portions of the superimposed interfering beams are propagating along slightly divergent axes. The Hardy device analyzes wave front aberrations much faster than necessary for laboratory optical system testing and, because of its speed, is very expensive. This device also requires a separate reference beam for comparison with the optically distorted beam.

At present, therefore, there still exists a need for an aberrated wave front analyzer of low cost and suitable for laboratory testing of optical systems.

SUMMARY OF THE INVENTION

It is therefore an object of the present invention to provide an economical apparatus and method for measuring the aberrated wave slope of an optical beam. It is a further object of the present invention to provide an aberrated wave front analyzing apparatus which does not require a reference beam.

To accomplish these and other goals and objectives, the present invention direct slope measurement shearing interferometer includes an interferometer with a 50/50 beam splitter, a modulating reference mirror and a steerable mirror pivotally mounted so as to form orthogonally oriented shearing interferograms at a detector array. In operation, the steerable mirror is pivoted about a first orthgonal axis and the reference mirror displaced a predetermined distance and returned to its initial position. The steerable mirror is then pivoted about a second orthogonal axis and the reference mirror again periodically displaced. During the periodic displacements of the reference mirror, the output of the detector array is sampled N times. The 2N detector intensity readings resulting from the two orthogonally oriented shearing interferograms, modulated by the periodic displacement of the reference mirror, are then manipulated by a suitable electronic circuit to provide the aberrated wave slope data. Since the beam splitter and modulating reference mirror provide an internal reference beam, the direct slope measurement shearing interferometer does not require an externally supplied reference beam.

The novel features which are believed to be characteristic of the present invention, together with further objectives and advantages thereof, will be better understood from the following description considered in connection with the accompanying drawing. It should be expressly understood, however, that the drawing is for purposes of illustration and description only and is not intended as a definition of the limits of the invention.

BRIEF DESCRIPTION OF THE DRAWINGS

FIG. 1 is a schematic representation of the direct slope measurement shearing interferometer of the present invention.

DETAILED DESCRIPTION

Referring to FIG. 1, there is shown a schematic diagram of the present inventive direct slope measurement shearing interferometer. The interferometer includes a 50/50 beam splitter 10, a plane reference mirror 14 and a plane steerable mirror 16. The mirrors are approximately perpendicularly oriented with respect to one another and face towards the beam splitter 10 which forms a 45° angle with each of the mirrors. An incoming aberrated wave front of an incident optical beam is split by beam splitter 10 into a reference beam 20 and a shearing beam 22, each having approximately one-half the intensity of the initial aberrated wave front. The reference beam 20 is reflected off the beam splitter 10 to the reference mirror 14, while the shearing beam 22 passes through the beam splitter 10 to strike the steerable mirror 16.

After reflecting off the reference mirror 14, the reference beam 20 is directed back through the beam splitter to a detector array 24. After reflecting off the steerable mirror 16, the shearing beam 22 is reflected by the beam splitter 10 to the detector array 24. If the steerable mirror 16 is oriented so as to have pivoted slightly about an axis perpendicular to the propagation axis of the incoming aberrated wave front, the combined reference beam and shearing beam will form a shearing interference pattern at the detector array 24. That is, the two beams forming the interference pattern will propagate along slightly divergent axes.

The optical elements making up the interferometer are conventional and widely used in the industry. The mirrors could be either first surface aluminum coated optical flats or precision polished copper flats. Beam splitters having a 50/50 reflective characteristic are well known and available from any number of optical component suppliers such as Melles Griot of Irvine, Calif.

The size of the detector array, number of detectors, and spacing of detectors within the array is primarily dependent upon the degree of spacial resolution sought in the aberrated waveform analysis. Typically, $100 \times 100$ diode arrays having detectors approximately 0.005 inches in diameter and spaced approximately 0.0025 inches apart are used. Such arrays are available from several sources such as Zygo Corporation of Middlefield, Conn. or Spectral Physics of California.

In operation, the steerable mirror 16 is first pivotally oriented at a small preselected angle about one axis perpendicular to the propagation axis of the incoming aberrated wave front. The preselected angle is easily determined by one skilled in the art. The reference mirror 14 is then displaced either towards or away from the beam splitter 10 a distance equal to approximately $\frac{1}{4}$ of a distorted optical beam wavelength and returned to its initial position. When the reference mirror 14 is at its maximal displacement, the optical path difference between the reference beam 20 and the steering beam 22 from their initial interaction with the beam splitter 10 to the detector array 24 is approximately $\frac{1}{2}$ of a distorted optical beam wavelength. While the reference mirror 14 is undergoing this periodic displacement, the intensity readings from each of the detectors in the detector array 24 is sampled N times.

When the reference mirror 14 is returned to its initial position, the steerable mirror 16 is restored to an untilted position and subsequently tilted the same predetermined small angle about an axis perpendicular to both the prior pivotal axis and the propagation axis of the incoming aberrated wavefront. After reorienting steerable mirror 16 the reference mirror 14 is again periodically displaced and the detector intensity values are again sampled N times. These N detector intensity values obtained for each pivoted orientation of the steerable mirror 16 provide the aberration wave slope values of the incoming distorted optical beam with respect to the orthogonal pivotal axes of the steerable mirror 16.

The periodic displacement of the reference mirror 14 can be easily achieved by a number of conventional devices such as, for example, attaching the reference mirror 14 to a precision linear translation device and displacing the device with a piezoelectric (PZT) crystal. Precision linear translation devices and PZT crystals are well known in the prior art and widely commercially available. As is well known in the art, a PZT crystal can be configured to alter a linear dimension when subjected to a voltage differential. The reference mirror PZT crystal can be connected to an appropriate power supply with a ramped output to periodically displace the reference mirror 14 a desired distance at a pre-selected modulation frequency. Similarly, steerable mirror 16 can be appropriately tilted by a number of conventional procedures such as, for example, supporting the steerable mirror 16 with a precision pivotal optical mount and using two PZT crystals to pivot the optical mount. The output of a power supply for the two steerable mirror PZT crystals and the power supply for the reference mirror PZT crystal can be appropriately clocked so as to pivot the steerable mirror 16 about one axis, periodically displace reference mirror 14, pivot steerable mirror 16 about a new axis and again periodically displays reference mirror 14.

The aberrated wave slope of the incoming optical beam can be easily obtained from the relationship:

$$\phi = OPD^*D \tag{1}$$

where $\phi$ is the phase shift between the wavefront in an aberrated and non-aberrated state and D is the separation distance of the shearing beam 22 at the detector array 24 between the pivoted and non-pivoted orientations of the steerable mirror 16.

The separation distance D can be calculated from the pre-selected angle through which steerable mirror 16 is pivoted, the distances from the center of the beam splitter 10 to the steerable mirror 16 and the distance from the center of the beam splitter 10 to the detector array 24. Alternatively, the displacement D can simply be measured by sending a narrow collimated beam into the interferometer, blocking off the reference mirror, and pivoting the steerable mirror 16. By determining which detectors are illuminated with the ray before and after pivoting the steerable mirror 16, one can ascertain D.

A technique for obtaining the phase difference is set forth by J. C. Wyant in the publication Applied Optics, Vol. 14, page 2622 (1975). At any given point in the shearing interference pattern the beam intensity variation caused by periodic movement of the reference mirror 14 can be written as:

$$I = I_0[1 + \sin(wt + \phi)] \tag{2}$$

where w is the modulation frequency. That is, $w = 2/T$ where T is the period of time over which the reference mirror 14 is moved from its initial position to its maximum displacement and back to its initial position.

By dividing the period T into N intervals, the beam intensity B(n) over each interval can be expressed as an integral. For the first integral, the beam intensity can be expressed as:

$$B(0) = I_o \int_{-T/2N}^{T/2N} [1 + \sin(wt + \phi)]dt \tag{3}$$

$$= I_o[T/N + 2/w\sin\phi\sin wT/2N] \tag{4}$$

During an arbitrary interval k, the intensity can be expressed as:

$$B(k) = I_o \int_{(2k-1)T/2N}^{(2k+1)T/2N} [1 + \sin(wt + \phi)]dt \tag{5}$$

If $N = 4$, the beam intensities for the 4 intervals can be expressed as:

$$B(0) = I_o T[1/4 + \sqrt{2}/2\pi \sin\phi] \tag{6}$$

-continued $$B(1) = I_oT[1/4 + \sqrt{2}/2\pi\cos\phi] \quad (7)$$

$$B(2) = I_oT[1/4 - \sqrt{2}/2\pi\sin\phi] \quad (8)$$

$$B(3) = I_oT[1/4 - \sqrt{2}/2\pi\cos\phi] \quad (9)$$

these expressions easily can be solved for $\phi$, yielding:

$$\phi = \arctan\left[\frac{B(0) - B(2)}{B(1) - B(3)}\right] \quad (10)$$

If the detector array intensities are sampled more than four times during the period T, then $\phi$ can be obtained from the general relationship:

$$\phi = \arctan\frac{\sum_{i=0}^{N/4-1} B(i) - \sum_{j=N/2}^{3N/4-1} B(j)}{\sum_{k=N/4}^{N/2-1} B(k) - \sum_{l=3N/4}^{N-1} B(d)} \quad (11)$$

While dividing the period T into intervals of N>4 may better filter noise of higher hormonics, intervals of N=4 should theoretically be sufficient for implementing the present phase measuring technique. Having the obtained the phase $\phi$, the aberrated wave slope $\Delta$OPD is then easily derived from equation 1 as stated above.

Electronic circuits capable of storing the necessary intensity values and calculating fast arc tangent algorithms are available in the industry. One such circuit is offered by Zygo Corporation of Middlefield, Conn. in connection with its Zygo Mark II and III Phase Detection Interferometers.

It will, of course, be understood that modifications of the present inventive direct slope measurement shearing interferometer will be apparent to others skilled in the art. By way of example, one could insert an additional beam splitter in front of the beam splitter 10 and use a second shearing interferometer to analyze the beam reflected off the additional beam splitter. This embodiment would obviate the need to pivot the steerable mirror 16 in either interferometer. Each of the previously steerable mirrors could then be fixed in rotation at a small angle with respect to mutually perpendicular axes. By way of another example, the steerable mirror 16 could be non-rotatably mounted perpendicular to the propagation axis of the incident distorted beam and the tilting apparatus discussed above appropriately connected to the modulating reference mirror 14. Thus, rather than tilting one mirror and displacing the other, both displacement and tilting would take place in connection with a single mirror. Consequently, the scope of the present invention should not be limited by the particular embodiments described above but should be defined only by the claims set forth below and equivalents thereof.

What is claimed is:

1. An interferometer for measuring the aberrated wave slope of an optical beam incident on said interferometer comprising:
   a plane reference mirror,
   displacement means for moving said reference mirror generally perpendicular to the plane of said reference mirror,
   a steerable mirror pivotally mounted generally perpendicular to said reference mirror,
   tilting means for rotating said steerable mirror a first preselected fixed amount about a first pivot axis generally perpendicular to a propagation axis of said incident beam,
   detector means for sensing an optical beam, and
   a partially reflecting mirror mounted with respect to said reference mirror and said steerable mirror so as to reflect a first portion of the incident beam to said reference mirror and transmit a second portion of the incident beam to said steerable mirror and further transmit a portion of a beam reflected off said reference mirror to said sensing means and reflect a portion of a beam reflected off said steerable mirror to said sensing means, wherein said beams reflected off said reference mirror and said steerable mirror form a first shearing interference pattern on said sensing means when said steerable mirror is partially rotated about said first pivot axis and wherein signal output from said detector means provides aberrated wave slope values with respect to a coordinate axis perpendicular to the first pivot axis.

2. An interferometer according to claim 1 wherein said tilting means further comprises means for rotating said steerable mirror a second preselected, fixed amount about a second pivot axis perpendicular to said first pivot axis and to the incident beam propagation axis, wherein said beams reflected off said reference mirror and said steerable mirror form a second shearing interference pattern on said sensing means, perpendicular to said first shearing interference pattern, when said steering mirror is partially rotated about said second pivot axis.

3. The interferometer of claim 1 wherein said partially reflecting mirror reflects one-half of a beam incident on said partially reflecting mirror and transmits one-half of said incident beam.

4. The interferometer of claim 1 wherein said displacement means includes at least one piezoelectric crystal.

5. The interferometer of claim 2 wherein said tilting means includes at least a first piezoelectric crystal for rotating said steerable mirror said first preselected, fixed amount about said first pivotal axis, and at least a second piezoelectric crystal for rotating said steerable mirror said second preselected, fixed amount about said second pivotal axis.

6. A method for obtaining aberrated wave slope data for an optical beam comprising:
   a. reflecting a first portion of the incident beam off a reference mirror,
   b. reflecting a second portion of the incident beam off a steerable mirror pivotally oriented at a preselected, fixed angle about a first axis perpendicular to a propagation axis of the optical beam,
   c. combining a reflection of the incident beam off the reference mirror and a reflection of the incident beam off the steerable mirror on a detector array such that the reflected beams form a first shearing interference pattern oriented in a first plane,
   d. displacing the reference mirror generally along the axis of propagation of the beam reflected off the reference mirror and returning the reference mirror to its initial position, and
   e. recording intensity signals received from the detector array a plurality of times during step d, wherein said intensity signals provide aberration slope data with respect to a coordinate axis parallel to the first plane of the first shearing interference pattern.

7. The method of claim 6 comprising the additional steps of:
   f. pivotally orienting the steerable mirror at a preselected, fixed angle about a second axis perpendicular to the first pivotal orientation axis and the propagation axis of the incident beam so that the combination of the beam reflected off the reference mirror and the beam reflected off the steerable mirror form a second shearing interference pattern oriented in a second plane which is perpendicular to the first plane of the first shearing interference pattern,
   g. repeating step d, and
   h. repeating step e, wherein the intensity signals obtained in steps e and h provide aberration slope data with respect to orthogonal coordinate axes parallel to the first and second planes of the first and second shearing interference patterns.

* * * * *